US011873960B2

(12) United States Patent
Sakino et al.

(10) Patent No.: US 11,873,960 B2
(45) Date of Patent: Jan. 16, 2024

(54) VEHICULAR LAMP

(71) Applicant: Ichikoh Industries, Ltd., Isehara (JP)

(72) Inventors: Katsuro Sakino, Isehara (JP); Katsuhiko Inoue, Isehara (JP); Eiji Suzuki, Isehara (JP)

(73) Assignee: Ichikoh Industries, Ltd., Isehara (JP)

( * ) Notice: Subject to any disclaimer, the term of this patent is extended or adjusted under 35 U.S.C. 154(b) by 0 days.

(21) Appl. No.: 17/907,058

(22) PCT Filed: Mar. 22, 2021

(86) PCT No.: PCT/JP2021/011759
§ 371 (c)(1),
(2) Date: Sep. 22, 2022

(87) PCT Pub. No.: WO2021/193556
PCT Pub. Date: Sep. 30, 2021

(65) Prior Publication Data

US 2023/0103138 A1 Mar. 30, 2023

(30) Foreign Application Priority Data

Mar. 23, 2020 (JP) ................................ 2020-050797

(51) Int. Cl.
*F21S 41/20* (2018.01)
*F21S 41/25* (2018.01)
(Continued)

(52) U.S. Cl.
CPC ........... *F21S 41/285* (2018.01); *F21S 41/143* (2018.01); *F21S 41/25* (2018.01); *F21S 41/32* (2018.01); *F21S 45/47* (2018.01)

(58) Field of Classification Search
CPC .......... F21S 45/47; F21S 41/25; F21S 41/285; F21S 41/143; F21S 41/32
See application file for complete search history.

(56) References Cited

U.S. PATENT DOCUMENTS 11,156,336 B1 * 10/2021 Kim ...................... F21S 43/247
2013/0265793 A1 10/2013 Helbig et al.
(Continued)

FOREIGN PATENT DOCUMENTS

CN 108375041 A 8/2018
JP 1-100304 U 7/1989
(Continued)

OTHER PUBLICATIONS

International Search Report dated May 25, 2021 in PCT/JP2021/011759, filed on Mar. 22, 2021, 3 pages.
(Continued)

*Primary Examiner* — Christopher E Dunay
(74) *Attorney, Agent, or Firm* — Oblon, McClelland, Maier & Neustadt, L.L.P.

(57) ABSTRACT

A vehicular lamp includes: a main light source that emits light for forming a predetermined irradiation pattern; an optical member that allows the light emitted from the main light source to travel toward a front side in an irradiation direction to form the irradiation pattern; a heat dissipation member that releases heat from the main light source to outside; and a light guide member that guides light from an auxiliary light source provided as a separate body from the main light source. In the heat dissipation member, the heat dissipation member is provided with an opening part that opens a mounting surface provided with the main light source, and the light guide member guides light from the auxiliary light source toward the mounting surface through the opening part.

8 Claims, 5 Drawing Sheets

(51) Int. Cl.

| | |
|---|---|
| ***F21S 41/143*** | (2018.01) |
| ***F21S 45/47*** | (2018.01) |
| ***F21S 41/32*** | (2018.01) |

(56) References Cited

U.S. PATENT DOCUMENTS

| | | | | |
|---|---|---|---|---|
| 2013/0343074 | A1 | 12/2013 | Tsukamoto | |
| 2018/0142859 | A1 | 5/2018 | Watanabe | |
| 2020/0047660 | A1 * | 2/2020 | Lu | F21S 41/395 |
| 2020/0200356 | A1 * | 6/2020 | Potter | F21S 43/241 |
| 2020/0208801 | A1 * | 7/2020 | Escudero-Uribe | F21S 41/285 |
| 2022/0107072 | A1 * | 4/2022 | Tanaka | F21S 41/285 |
| 2022/0307665 | A1 * | 9/2022 | Vogelauer | F21S 41/29 |
| 2023/0003353 | A1 * | 1/2023 | Umeda | B60Q 1/50 |

FOREIGN PATENT DOCUMENTS

| | | | |
|---|---|---|---|
| JP | 2010-118241 | A | 5/2010 |
| JP | 2016-48625 | A | 4/2016 |
| JP | 2018-92883 | A | 6/2018 |

OTHER PUBLICATIONS

Supplementary Extended European Search Report dated Sep. 1, 2023, in European Application No. 21774008.3, 50 pages.

* cited by examiner

VEHICULAR LAMP

TECHNICAL FIELD

The present disclosure relates to a vehicular lamp.

BACKGROUND ART

The vehicular lamp includes a lamp unit that forms a predetermined irradiation pattern. In such a vehicular lamp, a lamp unit appears bright when lit and a traveling lamp unit appears dark when unlit, so that appearance between when lit and when unlit is changed.

Therefore, a vehicular lamp configured to make a lamp unit appear brighter even when unlit it is considered (see PTL 1 and other documents, for example). This conventional vehicular lamp includes a passing lamp unit that forms a passing light distribution pattern, and a traveling lamp unit that forms a traveling light distribution pattern. This conventional vehicular lamp is provided with a guide reflector that guides a part of light from a light source of the passing lamp unit, and guides the light to the traveling lamp unit to serve the light as an auxiliary light source, so that the light is emitted to the front side in the irradiation direction from the traveling lamp unit when unlit. Therefore, the conventional vehicular lamp can appear bright by the light from the auxiliary light source even when unlit in the traveling lamp unit, and it is possible to suppress change in appearance between when lit and when unlit.

CITATION LIST

Patent Literature

PTL 1: Japanese Patent Laid-open No. 2018-92883

SUMMARY OF THE INVENTION

Problems to be Solved by the Invention

Herein, the conventional vehicular lamp is provided with a heat dissipation member that releases heat from the light source to the outside, and the light source is provided on a mounting surface of the heat dissipation member. Therefore, in the conventional vehicular lamp, when the auxiliary light source is provided at a position different from the mounting surface side with respect to the heat dissipation member, the configuration in which light from the auxiliary light source is guided toward the mounting surface becomes more complicated and the entire configuration increases in size, and when the above is avoided, the degree of freedom in the installation position of the auxiliary light source is suppressed.

The present disclosure has been made in view of the above circumstances, and an object of the present disclosure is to provide a vehicular lamp in which it is possible to suppress change in appearance between when lit and when unlit, while enhancing the degree of freedom of an installation position of an auxiliary light source, without increase in complication or size.

Means for Solving the Problem

A vehicular lamp of the present disclosure includes: a main light source that emits light for forming a predetermined irradiation pattern; an optical member that allows the light emitted from the main light source to travel toward a front side in an irradiation direction to form the irradiation pattern; a heat dissipation member that releases heat from the main light source to outside; and a light guide member that guides, toward a mounting surface provided with the main light source in the heat dissipation member, light from an auxiliary light source provided as a separate body from the main light source, wherein the heat dissipation member is provided with an opening part that opens the mounting surface, and the light guide member is disposed from the auxiliary light source toward the mounting surface through the opening part.

Effect of the Invention

According to a vehicular lamp of the present disclosure, it is possible to suppress change in appearance between when lit and when unlit, while enhancing the degree of freedom of an installation position of an auxiliary light source, without increase in complication or size.

MODE FOR CARRYING OUT THE INVENTION

Hereinafter, each of embodiments of a vehicular lamp according to the present disclosure will be described with reference to FIG. 1 to FIG. 5. In each of FIG. 2 and FIG. 5, a state in which light emitted from an emission surface 35 or 35A of a light guide member 30 or 30A travels is schematically illustrated, and does not necessarily coincide with an actual form.

First Embodiment

Figure 1:
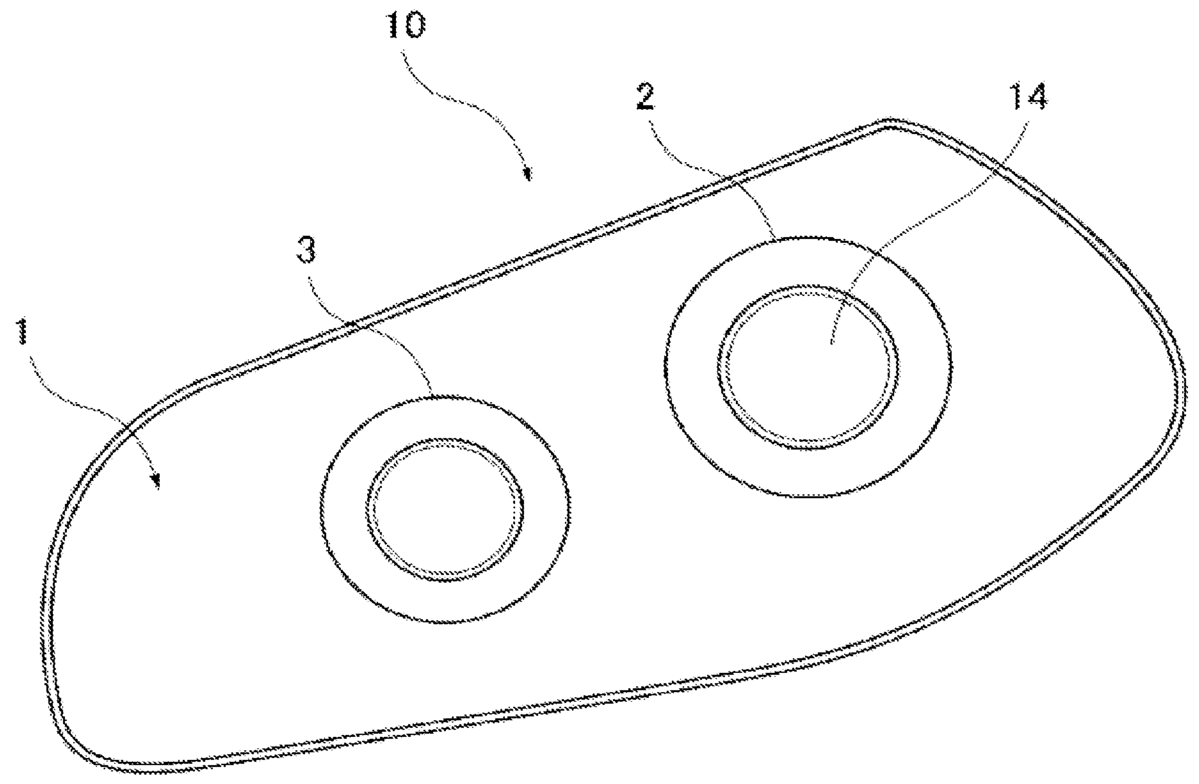
FIG. 1 is an explanatory diagram illustrating a configuration of a vehicular lamp of a first embodiment according to the present disclosure.

A vehicular lamp 10 is used as a lamp for a vehicle such as an automobile, and, for example, is used as a headlamp or a fog lamp. As illustrated in FIG. 1, the vehicular lamp 10 includes a traveling lamp unit 2 that forms a traveling light distribution pattern as a predetermined irradiation pattern. The vehicular lamp 10 is disposed on each of the right and left sides of a front portion of a vehicle, and is provided in a lamp chamber 1 composed of a lamp housing having an opened front end covered with an outer lens, via a vertical-direction optical axis adjustment mechanism and a width-direction optical axis adjustment mechanism. In the following description, in the vehicular lamp 10, the direction in which the vehicle travels straight and light is emitted is defined as the irradiation direction (Z in the drawing), the vertical direction in a state in which the vehicular lamp is mounted on the vehicle is defined as the vertical direction (Y in the drawing), and the direction orthogonal to the irradiation direction and the vertical direction is defined as the width direction (X in the drawing).

The vehicular lamp 10 of the first embodiment is provided with a passing lamp unit 3 that forms a passing light distribution pattern with a cutoff line at the upper edge. In the first embodiment, this passing lamp unit 3 composes the vehicular lamp 10 together with the traveling lamp unit 2 in the same lamp chamber 1. However, the passing lamp unit 3 may be provided separately from the vehicular lamp 10 (traveling lamp unit 2). The vehicular lamp 10 forms the passing light distribution pattern by turning on only the passing lamp unit 3, so that it is possible to implement light distribution at the time of passing (so-called low beam). In the vehicle, the traveling light distribution pattern is formed by turning on the traveling lamp unit 2 together with the passing lamp unit 3, and overlapping a lower end of the passing light distribution pattern on an upper end of the passing light distribution pattern, so that it is possible to implement light distribution at the time of traveling (so-called high beam).

Figure 2:
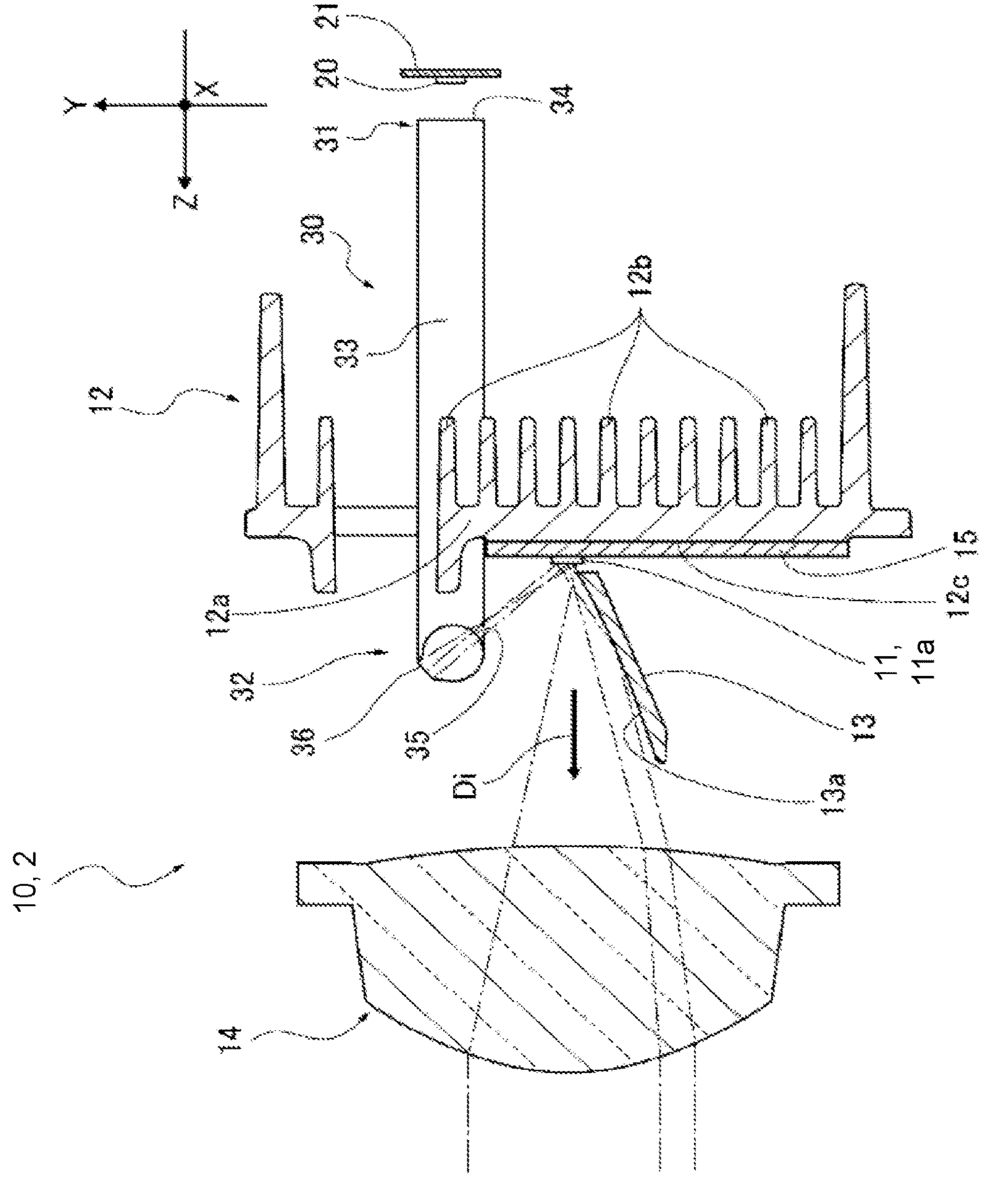
FIG. 2 is an explanatory diagram illustrating the configuration of the vehicular lamp in cross-section.

Now, an entire configuration of the vehicular lamp 10 will be described. As illustrated in FIG. 2, the vehicular lamp 10 includes a main light source 11, a heat dissipation member 12, a reflection member 13, and a projection lens 14, and composes a direct lens projection type (direct projector type) headlight unit.

The main light source 11 is composed of a light emitting element such as an LED (Light Emitting Diode) and is mounted on a substrate 15. The substrate 15 is fixed to a mounting surface 12*c* described below of the heat dissipation member 12. Consequently, the main light source 11 is mounted in a state of being positioned on the heat dissipation member 12 with the substrate 15 between the main light source 11 and the heat dissipation member 12, and the optical axis of light emission (emission direction Di in which the optical axis extends) substantially coincides with the irradiation direction. In the first embodiment, the front side in the irradiation direction (side on which the passing light distribution pattern is formed) is the front side in the emission direction Di. This main light source 11 is appropriately lit by receiving electric power from a lighting control circuit via the substrate 15. In the main light source 11, as an example, a plurality of light emitting elements 11*a* are aligned on the substrate 15 in the width direction (see FIG. 3 and FIG. 4), and power from the lighting control circuit is supplied to each light emitting element 11*a* individually, so that the light emitting elements are lit simultaneously or individually as appropriate.

The heat dissipation member 12 is a heat sink member that releases (dissipates) heat generated by the main light source 11 to the outside and is formed of thermally conductive aluminum die-cast or resin. The heat dissipation member 12 has an installation spot 12*a* and heat dissipation fins 12*b*. The installation spot 12*a* is a spot where the main light source 11 (the substrate 15) is installed, and is a flat plate shape perpendicular to the emission direction Di. At the installation spot 12*a*, a surface where the main light source 11 is provided via the substrate 15 (surface on the front side in the emission direction Di) is the mounting surface 12*c*. A plurality of the heat dissipation fins 12*b* are provided so as to protrude from the installation spot 12*a* to the rear side in the emission direction Di, and release heat generated by the main light source 11 installed at the installation spot 12*a* to the outside. The reflection member 13 is provided on the lower side in the vertical direction of the main light source 11 mounted on the substrate 15. In the actual heat dissipation member 12, heat is dissipated not only by the heat dissipation fins 12*b* but also by the installation spot 12*a*, and is not dissipated only by the heat dissipation fins 12*b*.

The reflection member 13 is provided below the main light source 11 so as to extend forward and diagonally downward from the installation spot 12*a*, and has an upper surface which is a reflection surface 13*a*. The reflection surface 13*a* reflects a part of light emitted from the main light source 11 to the projection lens 14 in order to emit the light upward from the projection lens 14, so that a part of the traveling light distribution pattern is formed. This reflection surface 13*a* is formed by surface treatment on the upper surface of the reflection member 13. This surface treatment blurs or diffuses a part of the traveling light distribution pattern to be formed, mainly in the vertical direction, so that the light is reflected while diffusing. The degree of diffusion and reflectance of the surface treatment should be set appropriately according to the size, the shape, the brightness, or the like required for a part of the traveling light distribution pattern to be formed.

The projection lens 14 has a rear focus set near the main light source 11 on the substrate 15. The projection lens 14 projects light emitted from the main light source 11 toward the front of the vehicle to form the traveling light distribution pattern. The projection lens 14 is supported by a lens holder. The lens holder is made of a resin member with lower thermal conductivity (higher thermal resistance) than the heat dissipation member 12, and is assembled to the heat dissipation member 12 with the projection lens 14 positioned with respect to the main light source 11 and the reflection member 13.

Now, an essential constitution of the vehicular lamp 10 will be described. In the vehicular lamp 10, an auxiliary light source 20, and a light guide member 30 that guides light from the auxiliary light source toward the mounting surface 12*c* of the heat dissipation member 12 are provided. The auxiliary light source 20 is provided at a different spot from the mounting surface 12*c* as a separate body from the main light source 11, and is installed on the rear side in the emission direction Di of the main light source 11 with respect to the installation spot 12*a* of the heat dissipation member 12. In the first embodiment, the auxiliary light source 20 is composed of a light-emitting element such as an LED and is mounted on an external substrate 21, and is disposed such that the optical axis of light emission is disposed along the emission direction Di of the main light source 11 substantially, and power is supplied from the lighting control circuit via the external substrate 21 to light up as appropriate.

The auxiliary light source 20 may be of any other configuration as long as the auxiliary light source 20 emits light directed toward the mounting surface 12*c*, and is not limited to the configuration of the first embodiment. At this time, the emission optical axis of the auxiliary light source 20 only needs to be set appropriately and is not limited to the configuration of the first embodiment. As another example, a part of the light from a light source in a passing lamp unit 3 can be used as an auxiliary light source 20. In this case, for example, when light that is blocked by a shade is used in order to form a cutoff line in the passing lamp unit 3, the light can be used as the auxiliary light source 20 without any effect on a passing light distribution pattern.

Figure 3:
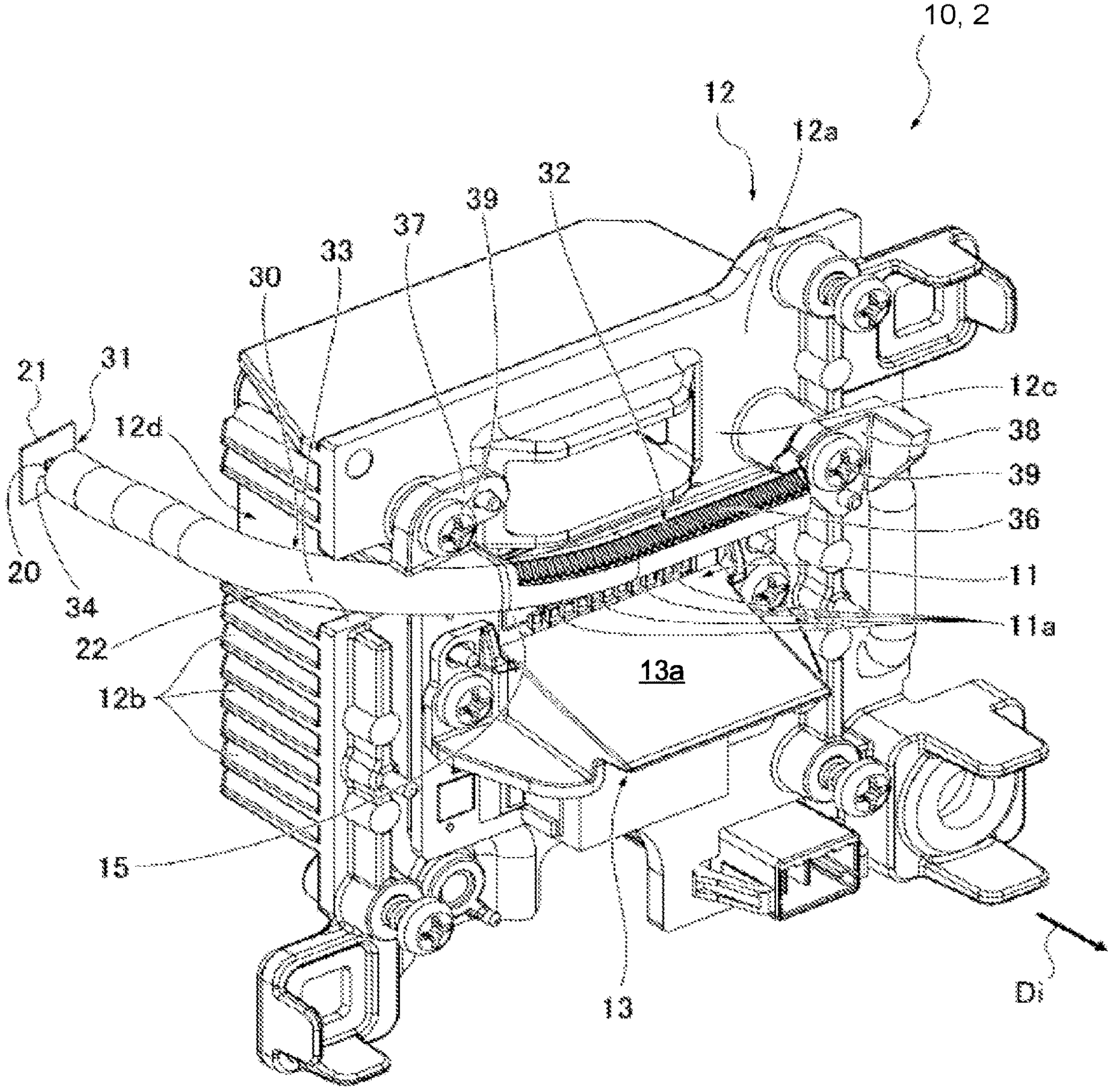
FIG. 3 is a perspective view illustrating a configuration of the periphery of a heat dissipation member in the vehicular lamp.
Figure 4:
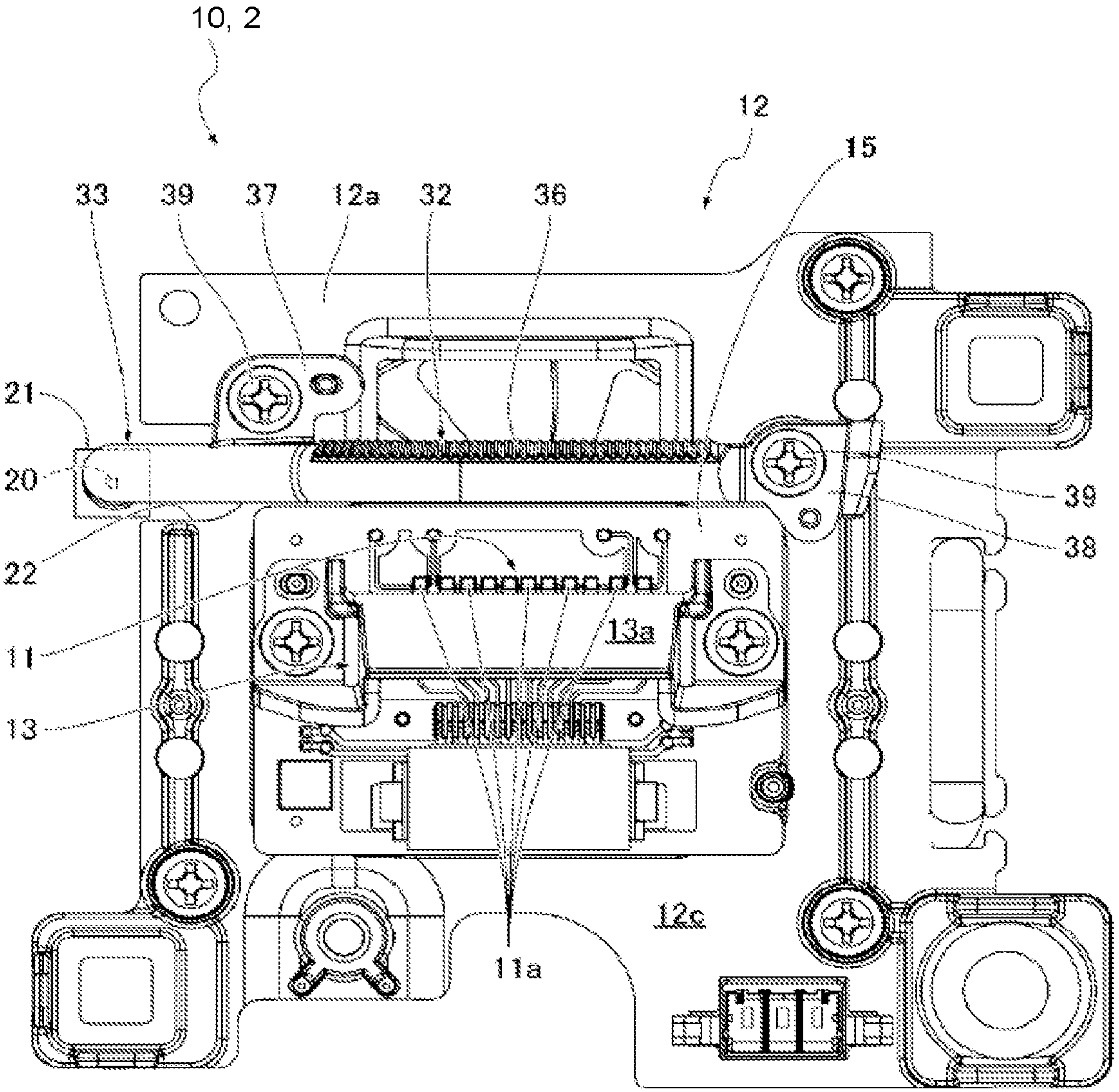
FIG. 4 is an explanatory diagram illustrating a vehicular lamp of FIG. 3 viewed from the front side in the emission direction.

As illustrated in FIG. 3 and FIG. 4, in the vehicular lamp 10, an opening part 22 is provided in the installation spot 12*a* of the heat dissipation member 12 in order to install the light guide member 30. This opening part 22 penetrates the installation spot 12*a* in the emission direction Di to open the mounting surface 12*c* so as to enable shortening of a path from the auxiliary light source 20 provided on the rear side in the emission direction Di with respect to the installation spot 12*a* toward the mounting surface 12*c* of the heat dissipation member 12. The opening part 22 of the first embodiment is a cutout part formed by cutting an end on the left side at an intermediate position in the vertical direction viewed from the front in FIG. 3 and FIG. 4, in the installation spot 12*a*. Accordingly, in the heat dissipation member 12, as illustrated in FIG. 3, a placement space 12*d* is formed on the rear side in the emission direction Di with respect to the opening part 22. This placement space 12*d* is formed by setting the rear side in the emission direction Di with respect to the opening part 22 to a spot where the heat dissipation fins 12*b* are not partially formed.

The light guide member 30 directs light emitted from the auxiliary light source 20 toward the mounting surface 12*c*, as illustrated in FIG. 2 to FIG. 4, and has a long rod shape. This light guide member 30 is formed of a colorless transparent resin material (transmissive member) that allows light to pass through. Herein, the colorless transparent material means that the light emitted from the auxiliary light source 20 is transmitted without changing the color.

The light guide member 30 is a long rod with a substantially circular cross section. One end of the light guide member 30 is an incident part 31, the other end thereof is an emission part 32, and a middle part between the one end and the other end is a light guide main body The other end is the emission part 32, and the middle part is a light guide main body 33. The incident part 31 has an incident surface 34 facing the auxiliary light source 20 (its emission surface). The incident surface 34 allows light emitted from the auxiliary light source 20 to enter the light guide member 30, and is a flat surface in the first embodiment. As long as the light from the auxiliary light source 20 is efficiently incident, the shape of the lens can be set appropriately, and the incident surface 34 is not limited to the configuration of the first embodiment.

The light guide main body 33 does not emit light incident from the incident surface 34 (incident part 31) to the outside by using total reflection, but rather, allow the light to travel in the direction in which the light itself extends, and guides the light to the emission part 32. The light guide member 30 may be made to reflect light by bonding aluminum, silver, or other material to an outer surface thereof by vapor deposition, painting, or other means. The light guide main body 33 of the first embodiment extends from the incident part 31 (incident surface 34) to the front side in the emission direction Di, and is disposed in the placement space 12*d* of the heat dissipation member 12, and is curved toward the main light source 11 after passing through the opening part 22, and is curved toward the main light source 11 after passing through the opening part 22, and extends toward the mounting surface 12*c* of the heat dissipation member 12. The light guide main body 33 has an end extending toward the mounting surface 12*c* and connected to the emission part 32. Therefore, the light guide main body 33 allows light incident from the incident part 31 (incident surface 34) at one end to travel to the emission part 32 at the other end.

The emission part 32 is diagonally upward on the front side in the emission direction Di with respect to the main light source 11, and is provided between the heat dissipation member 12 provided with the main light source 11, and the projection lens 14. The emission part 32 extends in the width direction along the plurality of light emitting elements 11*a* of the main light source 11 in parallel to the mounting surface 12*c* at such a position as not to block incidence of light emitted from the main light source 11 on the projection lens 14. In the emission part 32, a surface facing the main light source 11 is an emission surface 35, a reflection spot 36 is provided on the opposite side. The reflection spot 36 is formed such that recessed parts and protruding parts extending in the direction perpendicular to the direction in which the light guide member 30 extends are alternately arranged in the direction in which the light guide member 30 extends (see FIG. 3 and FIG. 4). The reflection spot 36 reflects the light guided to the emission part 32 toward the emission surface 35 while diffusing the light by using total reflection in accordance with the shapes of the concave and the convex parts. As long as the reflection spot 36 reflects light toward the emission surface 35, the reflection spot 36 may reflect light by bonding aluminum, silver, or other material by vapor deposition, painting, or other means, or the reflection spot 36 may be in any other shape, and the reflection spot 36 is not limited to the configuration of the first embodiment.

Therefore, the emission part 32 reflects the light guided by the light guide main body 33 at the reflection spot 36 to emit the light from the emission surface 35 to the main light source 11 (each light emitting element 11*a*) facing the emission surface 35. Consequently, the light guide member 30 can illuminate the main light source 11, that is, an entire area extending in the width direction and provided with the main light source 11 in the substrate 15, by using the light from the auxiliary light source 20.

As illustrated in FIG. 3 and FIG. 4, the emission part 32 is provided with a first fixing part 37 and a second fixing part 38. Both the fixing parts (37, 38) are provided to fix the emission part 32 to the installation spot 12*a* (mounting surface 12*c*) of the heat dissipation member 12, and in the first embodiment, the screw members 39 are used to enable the fixing. The first fixing part 37 is provided near the opening part 22, that is, in an end on the side close to the light guide main body 33 in the emission part 32. The second fixing part 38 is provided near a leading edge of the emission part 32, that is, in an end on the side close to the light guide main body 33 in the emission part 32.

Therefore, in the emission part 32, the first fixing part 37 and the second fixing part 38 are fixed to the installation spot 12*a*, so that the emission surface 35 is extended over the main light source 11 (light emitting elements 11*a*) between both the fixing parts (37, 38) at such a position as not to block incidence of the light emitted from the main light source 11 on the projection lens 14. Consequently, the emission part 32 enables appropriate positional relation of the emission surface 35 with respect to the main light source 11, and can maintain the positional relation even when vibration or the like is generated.

In addition, in the light guide member 30, the first fixing part 37 is provided near the opening part 22, and therefore positional relation of the light guide main body 33, which is disposed in the placement space 12*d* and passes through the opening part 22, with respect to the opening part 22 can be made appropriate, and contact of the light guide main body 33 to the opening part 22 can be prevented even when vibration or the like is generated.

This vehicular lamp 10 operates as follows. The vehicular lamp 10 supplies power from the lighting control circuit to the main light source 11 from the substrate 15 to light the main light source 11 (each light emitting element 11*a* thereof) as appropriate. Consequently, the vehicular lamp 10 forms the traveling light distribution pattern by reflecting light from the main light source 11 directly or by the reflection member 13 and thereafter projecting the light by the projection lens 14. At this time, in the vehicular lamp 10, the passing lamp unit 3 is lit, so that it is possible to form the passing light distribution pattern partially overlapped on a lower end of the traveling light distribution pattern, and implement light distribution at the time of traveling. Therefore, in the vehicular lamp 10, the projection lens 14 functions as an optical member that forms a predetermined irradiation pattern by projecting light from the main light source 11 on the front side in the irradiation direction, and the projection lens 14 serves as light emitting spot that emits light as viewed from the front side in the irradiation direction.

The vehicular lamp 10 turns off the main light source 11 in a situation where only the passing lamp unit 3 is turned on to form a passing light distribution pattern. In addition, power from the lighting control circuit is supplied from the external substrate 21 to the auxiliary light source 20 to turn on the auxiliary light source 20. Then, in the vehicular lamp 10, light from the auxiliary light source 20 is incident onto the light guide member 30 from the incident surface 34, is guided to the emission part 32 by the light guide main body 33, and then emitted from the emission surface 35 toward the main light source 11. Consequently, the vehicular lamp 10 illuminates the entire main light source 11 with the light from the auxiliary light source 20.

Therefore, the vehicular lamp 10 can illuminate the main light source 11 with the light from the auxiliary light source 20 even when the main light source 11 is not turned on. Herein, the vehicular lamp 10 is set such that the light emitted from the main light source 11 is projected by the projection lens 14 to form a light distribution pattern for driving. Therefore, in the vehicular lamp 10, the light amount reduces compared to a case where the main light source 11 is turned on, but the entire main light source 11 is illuminated, so that light can be projected by the projection lens 14 substantially similarly to the case where the traveling light distribution pattern is formed, and it is possible to make the entire projection lens 14 appear bright. Consequently, in the vehicular lamp 10, even when the main light source 11 is turned off, the entire projection lens 14 can be made bright simply by turning on the auxiliary light source 20, and it is possible to improve conspicuity and improve design (appearance). In particular, in a case where the vehicular lamp 10 has the auxiliary light source 20 as a part of the light from the light source of the passing lamp unit 3, the projection lens 14 can be made bright when the passing lamp unit 3 is lit regardless of turning on/off of the main light source 11, and therefore the appearance of the light distribution at the time of passing and the appearance of the light distribution at the time of traveling can be made similar.

Herein, a conventional vehicular lamp is provided with a heat dissipation member on the rear side in the emission direction Di of a main light source, and therefore it is necessary to install an auxiliary light source while avoiding a heat dissipation member, resulting in a reduction in the degree of freedom of placement. In addition, in the conventional vehicular lamp, it is necessary to dispose the light guide member so as to guide light toward a mounting surface while avoiding the heat dissipation member, resulting in an increase in an entire structure by the size of the avoided light guide member. In particular, in the conventional vehicular lamp, when a part of light from a light source of a passing lamp unit 3 is used as an auxiliary light source, restriction in placement relationship with the passing lamp unit 3 may be caused, or the light guide member may be complicated in shape. In addition, in the conventional vehicular lamp, when a light guide member that guides light by making light travel internally is used, it is necessary to reduce the curvature at curved points (make the degree of curvature gentle) in order to prevent light leakage from an unintended spot. Then, in the conventional vehicular lamp, when the heat dissipation member is avoided by reduction in the curvature of the light guide member, the entire structure is increased due to significant protrusion of the light guide member.

In contrast, the vehicular lamp 10 is provided with the opening part 22 that opens the mounting surface 12*c* at the installation spot 12*a* of the heat dissipation member 12. Therefore, even when the vehicular lamp 10 is provided with the auxiliary light source 20 on the rear side in the emission direction Di with respect to the installation spot 12*a*, the light guide member 30 is disposed through the opening part 22, and therefore it is possible to guide light from the auxiliary light source 20 toward the mounting surface 12*c*. Therefore, in the vehicular lamp 10, it is possible to suppress the degree of freedom of placement of the auxiliary light source 20, and the light guide member 30 can be efficiently provided, so that it is possible to suppress increase in size of the entire structure. In particular, the vehicular lamp 10 is provided with the placement space 12*d* on the rear side in the emission direction Di of the opening part 22 in the heat dissipation member 12, and therefore the light guide member 30 can be provided more efficiently. In addition, in the vehicular lamp 10, the light guide member 30 that guides light by making the light travel internally is used. Even when the curvature of a cured spot of the light guide main body 33 is reduced, passing through the opening part 22 can prevent the light guide member 30 from protruding significantly, and it is possible to suppress increase in size of the entire structure while enhancing light use efficiency. Furthermore, in the vehicular lamp 10, the light guide member 30 that emits, from the emission surface 35, light which travels internally from the incident surface 34 is used, and therefore other member prevents traveling (light path) of the light from the auxiliary light source 20 from being blocked. In addition, in the vehicular lamp 10, in a case where the auxiliary light source 20 serves as a part of the light from the light source of the passing lamp unit 3, it is possible to enhance the degree of freedom of the positional relationship with respect to the passing lamp unit 3, and it is possible to secure the degree of freedom of design as a whole.

The vehicular lamp 10 according to the first embodiment can obtain each of the following effects.

The vehicular lamp 10 is provided with the opening part 22 that opens the mounting surface 12*c* in the heat dissipation member 12, and the light guide member 30 that guides light from the auxiliary light source 20 toward the mounting surface 12*c* through the opening part 22 is disposed. Therefore, even when the main light source 11 is turned off, the vehicular lamp 10 can illuminate the mounting surface 12*c* side with light from the auxiliary light source 20 by the light guide member 30, and the light guide member 30 can be efficiently installed regardless of the positional relationship between the auxiliary light source 20 and the heat dissipation member 12. Accordingly, in the vehicular lamp 10, the degree of freedom in the installation position of the auxiliary light source 20 can be enhanced without causing complication or increase in size, and it is possible to suppress change in appearance between when lit and when unlit.

In the vehicular lamp 10, the emission surface 35 of the light guide member 30 is provided along the mounting surface 12*c*. Therefore, in the vehicular lamp 10, an interval between the main light source 11 and the emission surface 35 can be made equal over the whole of the emission surface 35, and light from the auxiliary light source 20 can be guided toward the mounting surface 12*c* substantially equally regardless of change in the emission spot on the emission surface 35, and the vehicular lamp 10 can be made appear brighter even when unlit similarly to a case of lighting.

In the vehicular lamp 10, the projection lens 14 that projects light emitted from the main light source 11 to the front side in the irradiation direction is used as an optical member, and the emission surface 35 makes the light emit toward the main light source 11. Therefore, in the vehicular lamp 10, light can be projected by the projection lens 14 substantially similarly to the case where the predetermined light distribution pattern (traveling light distribution pattern in the first embodiment) is formed, and it is possible to make the entire projection lens 14 appear bright.

In the vehicular lamp 10, the light guide member 30 is provided by being fixed to the mounting surface 12*c* at the first fixing part 37 near the opening part 22 and being fixed to the mounting surface 12*c* at the second fixing part 38 opposite to the first fixing part 37 with the main light source 11 interposed between the first fixing part 37 and the second fixing part 38. Therefore, the vehicular lamp 10 can have an appropriate positional relation of the light guide member 30, that is, the emission surface 35, with respect to the main light source 11. In other words, the emission surface 35 can be precisely positioned with respect to the main light source 11, and therefore light from the auxiliary light source 20 can be guided while maintaining a simple configuration.

In the vehicular lamp 10, an end of the mounting surface 12*c* (installation spot 12*a*) is cut out, so that the opening part 22 is formed. Therefore, in the vehicular lamp 10, the light guide member 30 can be disposed into the opening part 22 from the lateral side by the cutting, and therefore assembly can be facilitated.

Therefore, in the vehicular lamp 10 of the first embodiment as the vehicular lamp 10 according to the present disclosure, the degree of freedom in the installation position of the auxiliary light source 20 can be enhanced without causing complication or increase in size, and it is possible to suppress change in appearance between when lit and when unlit.

In the first embodiment, light from the auxiliary light source 20 is guided by the light guide member 30 so as to illuminate the main light source 11. However, as long as the light guide member 30 guides light from the auxiliary light source 20 toward the mounting surface 12*c* provided with the main light source 11 in the heat dissipation member 12, for example, light may be directly emitted from the projection lens 14, or other spot may be illuminated, and the present disclosure is not limited to the configuration of the first embodiment.

In the first embodiment, the vehicular lamp 10 is configured as the traveling lamp unit 2 that forms the traveling light distribution pattern. However, as long as the vehicular lamp 10 forms the predetermined light distribution pattern by light from the main light source 11, other light distribution pattern such as the passing light distribution pattern and a light distribution pattern as DRL (daytime traveling light), and the present disclosure is not limited to the configuration of the first embodiment.

Second Embodiment

Figure 5:
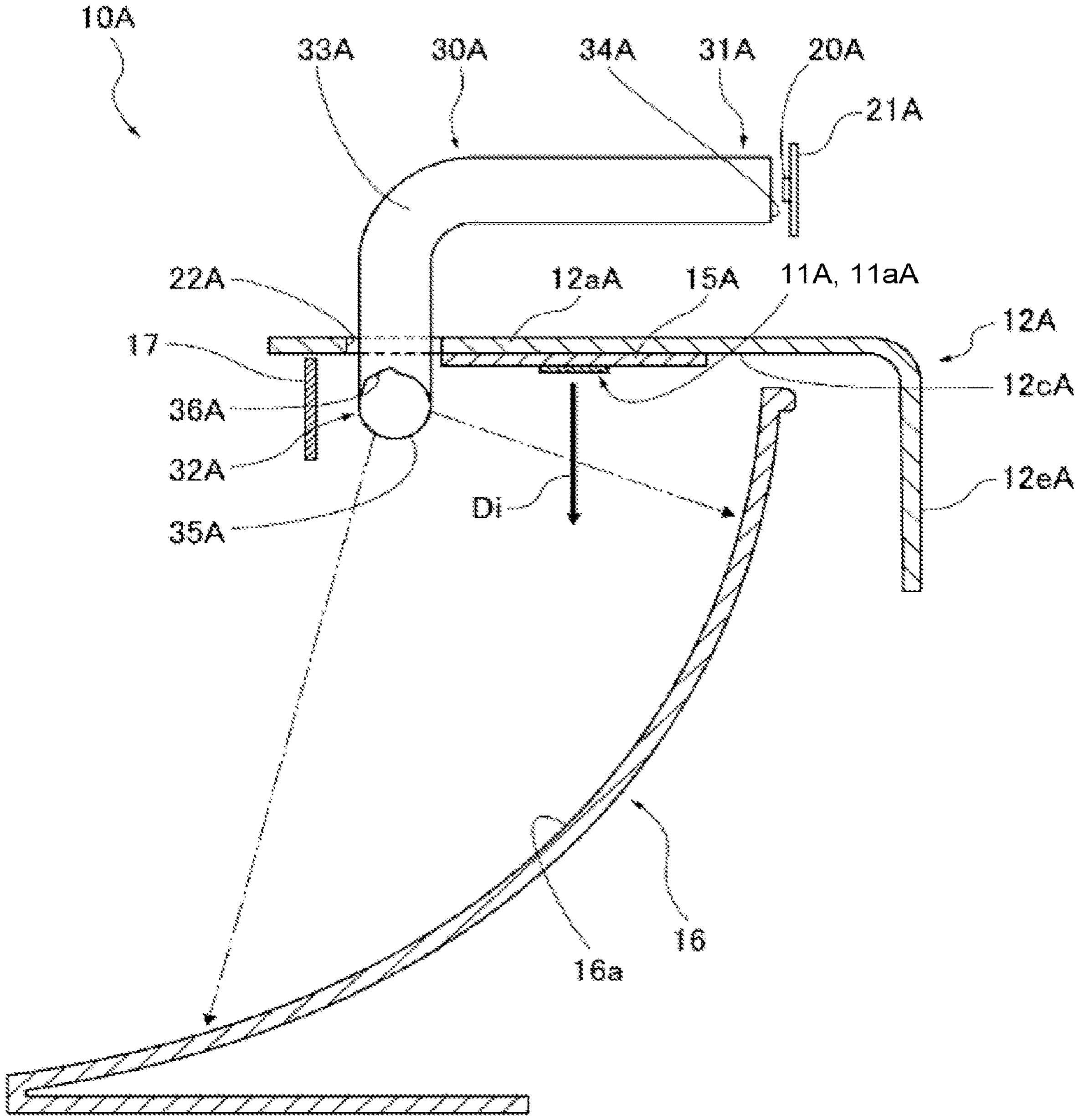
FIG. 5 is an explanatory diagram illustrating a vehicular lamp of a second embodiment according to the present disclosure.

Now, a vehicular lamp 10A of a second embodiment as an embodiment of the present disclosure will be described with reference to FIG. 5. The vehicular lamp 10A is an example different from the vehicular lamp 10 in an irradiation method. This vehicular lamp 10A is similar in a basic concept and configuration to the vehicular lamp 10 of the first embodiment, and therefore the same reference numerals are attached to parts of the same configuration, and detailed explanation thereof will be omitted.

The vehicular lamp 10A of the second embodiment is provided in a lamp chamber 1 formed of a lamp housing and an outer lens, via a vertical-direction optical axis adjustment mechanism and a width-direction optical axis adjustment mechanism, similarly to the vehicular lamp 10. As illustrated in FIG. 5, the vehicular lamp 10A includes a main light source 11A, a heat dissipation member 12A, a reflector 16, and a shade 17 to form a reflector-type headlight unit. The reflector 16 has a reflection surface 16*a* that is a free curved surface based on an ellipse with the main light source 11A as a first focal point, and reflects light from the main light source 11A forward by the reflection surface 16*a* to form a predetermined light distribution pattern. This predetermined light distribution pattern may be a traveling light distribution pattern as in the first embodiment, or may be another light distribution pattern, such as a light distribution pattern as a DRL (daytime traveling light).

The main light source 11A is composed of a plurality of light emitting elements 11*a*A such as LEDs aligned in the width direction (in FIG. 5, only one is illustrated on the front side in front view) and mounted on a substrate 15 A is mounted on a substrate 15A. The substrate 15A is fixed to a mounting surface 12*c*A of the heat dissipation member 12A, the emission optical axis of light from the main light source 11A (the emission direction Di in which the emission optical axis extends) is set to the lower side in a substantially vertical direction. In the second embodiment, the lower side in the vertical direction is the front side in emission direction Di. This main light source 11A is turned on as appropriate with power supplied from a lighting control circuit via the substrate 15A.

The heat dissipation member 12A is a heat dissipation member that radiates heat to the outside and is composed of a plate-shaped metal material that is perpendicular to the vertical direction and is curved, and has an installation spot 12*a*A and a heat dissipation spot 12*e*A. The installation spot 12*a*A is a spot where the main light source 11A is installed, a surface on the lower side in the vertical direction in the heat dissipation member 12A is the mounting surface 12*c*A provided with the main light source 11A with the substrate 15*a* therebetween.

The heat dissipation spot 12*e*A is a spot provided for heat dissipation in the heat dissipation member 12A, and is continuous with the installation spot 12*a*A on the rear side in the irradiation direction, and is curved toward the lower side in the vertical direction. In the heat dissipation spot 12*e*A, a heat dissipation fin that protrudes to the rear side in the irradiation direction may be provided. The heat dissipation spot 12*e*A is located outside the reflector 16 (behind and outside a light control range) and is used to dissipate the heat of the installation spot 12*a*A. In the heat dissipation member 12A, a heat dissipation fin may be provided by protruding to the upper side of the installation spot 12*a*A in the vertical direction as appropriate, and is not limited to the configuration of the second embodiment.

In this vehicular lamp 10A, in order to install the light guide member 30A, an opening part 22A that is a through hole which penetrates in the emission direction Di is provided in the installation spot 12*a*A of the heat dissipation member 12A. The light guide member 30A guides light from an auxiliary light source 20A toward the mounting surface 12*c*A of the heat dissipation member 12A. The auxiliary light source 20A is provided on the rear side in the emission direction Di with respect to the installation spot 12*a*A. The auxiliary light source 20A is composed of a light emitting element such as an LED in the first embodiment and is mounted on an external substrate 21A, and is turned on as appropriate with power supplied from the lighting control circuit via the external substrate 21A. As long as the auxiliary light source 20 emits light that is guided toward the mounting surface 12*c*, the configuration and the like may be set as appropriate, and is not limited to the configuration of the second embodiment.

In the light guide member 30A, an incident surface 34A of an incident part 31A at one end faces the auxiliary light source 20A, and an emission part 32A at the other end is disposed on the mounting surface 12*c*A side of the installation spot 12*a*A near the opening part 22A. The emission part 32A extends in the width direction along the aligned a plurality of light emitting elements 11*a*A of the main light source 11A, and is parallel to the mounting surface 12*c*A. In the emission part 32A, the emission surface 35A is directed toward the reflection surface 16*a* of the reflector 16, and the reflection spot 36A is located on the side opposite to the reflection surface 16*a*. The light guide main body 33A extends from the incident part 31A facing the auxiliary light source 20A toward the emission part 32A where the emission surface 35A is directed toward the reflection surface 16*a*, through the opening part 22A.

The shade 17 is provided on the front side in the irradiation direction with respect to the emission part 32A disposed on the mounting surface 12*c*A side. The shade 17 is formed in a plate shape extending in the substantially vertical direction, and when the vehicular lamp 10A is viewed from the outside, that is, from the front side in the irradiation direction, the emission part 32A is prevented from being viewed. The shade 17 has such a position and size that light from the main light source 11A or the emission part 32A is not prevented from being reflected by the reflection surface 16*a* of the reflector 16 to emit from an outer lens.

In this vehicular lamp 10A, the main light source 11A is turned on as appropriate with power supplied from the lighting control circuit. Then, the vehicular lamp 10A reflects the light emitted from the main light source 11A forward by the reflection surface 16*a* of the reflector 16, and emits the reflected light from the outer lens to illuminate in front of the vehicle as a predetermined light distribution pattern. Therefore, in the vehicular lamp 10A, the reflector 16 functions as an optical member that reflects the light from the main light source 11A to the front side in the irradiation direction to form a predetermined irradiation pattern. The reflection surface 16*a* serves a light emitting spot that emits as viewed from the front side in the irradiation direction.

Then, the vehicular lamp 10A guides the light from the auxiliary light source 20A by the light guide member 30A, and emits the guided light from the emission surface 35A toward the reflector 16 (reflection surface 16*a*) facing the emission surface 35A. Consequently, the vehicular lamp 10A can illuminate, with the light from the auxiliary light source 20A, an entire area where the light from the main light source 11A is reflected on the reflection surface 16*a*. Herein, in the vehicular lamp 10A, the light emitted from the main light source 11A is reflected on the reflector 16 (reflection surface 16*a*) to form a predetermined light distribution pattern. Therefore, in the vehicular lamp 10A, even when the main light source 11A is not turned on, the reflection surface 16*a* can be illuminated with the light from the auxiliary light source 20A. Therefore, the reflection surface 16*a* can be made to appear brighter as a whole, substantially similar to the case where the predetermined light distribution pattern is formed. Consequently, even when the vehicular lamp 10A employs a method of forming a predetermined light distribution pattern by reflection with the reflector 16 (reflection surface 16*a*), appearance when the main light source 11A is lit and appearance when the main light source 11A is unlit can be made similar while suppressing reduction in the degree of freedom of placement of the auxiliary light source 20A, and increase in size of the entire structure with a simple configuration.

The vehicular lamp 10A of the second embodiment can obtain the following each operational effect. This vehicular lamp 10A basically has the same configuration as that of the vehicular lamp 10 according to the first embodiment, and therefore the same effect as that in the first embodiment may be obtained.

In addition, the vehicular lamp 10A uses the reflector 16 that reflects the light emitted from the main light source 11 to the front side in the irradiation direction, as an optical component, and the emission surface 35 emits light toward the reflector 16. Therefore, the vehicular lamp 10 can reflect light on the reflector 16 in substantially the same manner, as the case where a predetermined light distribution pattern is formed, and the reflector 16 (reflection surface 16*a* thereof) can be made to appear brighter as a whole.

The vehicular lamp 10A is also formed with the opening part 22A that penetrates the mounting surface 12*c*A (installation spot 12*a*A). Therefore, the vehicular lamp 10 can be provided with the opening part 22A at an appropriate position according to a position to be irradiated with light from the auxiliary light source 20A and the emission surface 35, and the entire configuration can be made simpler.

Therefore, in the vehicular lamp 10A of the second embodiment as the vehicular lamp according to the present disclosure, it is possible to suppress the change in appearance between when lit and when unlit while enhancing the degree of freedom of the installation position of the auxiliary light source 20A without complicating or increasing the size.

In the second embodiment, light from the auxiliary light source 20A is guided by the light guide member 30A so as to illuminate the reflection surface 16*a* of the reflector 16. However, as long as the light guide member 30A guides the light from the auxiliary light source 20A toward the mounting surface 12*c*A provided with the main light source 11A in the heat dissipation member 12A, for example, the light may be directly emitted from the outer lens or illuminate other spot, and the configuration is not limited to the configuration of the second embodiment.

The vehicular lamp according to the present disclosure is described above on the basis of each of the embodiments, but specific configurations are not limited to the embodiments, and design modifications, additions, and the like are allowable without departing from the gist of the invention according to the claims in the scope of claims.

In the vehicular lamp, the opening part 22 is formed by cutting out the end of the mounting surface 12*c* (installation spot 12*a*) as the direct lens projection type in the first embodiment, and the opening part 22A is formed by penetrating the mounting surface 12*c*A (installation spot 12*a*A) as the reflector type in the second embodiment. However, the opening part formed by penetrating the mounting surface may be provided for the direct lens projection type, and the opening part formed by cutting out the end of the mounting surface may be provided for the reflector type. The opening part is not limited to the configuration of each embodiment.

In the respective embodiments, the heat dissipation members 12 and 12A are provided as separate bodies from the substrates 15 and 15A mounted with the main light sources 11 and 11A. However, as long as the heat dissipation member releases heat from the main light source to the outside, the heat dissipation member may be a substrate or any other member, and is not limited to the configuration of each example.

Furthermore, each embodiment uses the light guide member 30 that allows light to travel internally from the incident surface 34 and to emit from the emission surface 35. However, the light guide member guides light from the auxiliary light source toward the mounting surface in the heat dissipation member, and may be of any other configuration as long as the light guide member passes through an opening part that opens the mounting surface, and the light guide member is not limited to the configuration of each embodiment.

DESCRIPTION OF REFERENCE NUMERALS

10 vehicular lamp
11 main light source
12 heat dissipation member
12*c* mounting surface
14 projection lens (as an example of an optical member)
16 reflector (as an example of an optical member)
22 opening part
30 light guide member
34 incident surface
35 emission surface
37 first fixing part
38 second fixing part

The invention claimed is:

1. A vehicular lamp comprising:
a main light source that emits light for forming a predetermined irradiation pattern;
an optical member that allows the light emitted from the main light source to travel toward a front side in an irradiation direction to form the irradiation pattern;
a heat dissipation member that includes a mounting surface on which the main light source is provided, and releases heat from the main light source to outside; and
a light guide member that guides light from an auxiliary light source provided as a separate body from the main light source, wherein
the heat dissipation member includes an opening part that opens the mounting surface, and
the light guide member passes through the opening part and curves toward the main light source, said light guide member further including an emission part that extends in a width direction of the main light source in parallel to the mounting surface.

2. The vehicular lamp according to claim 1, wherein
the light guide member has an incident surface on which the light from the auxiliary light source is incident, and an emission surface that allows light to emit toward the mounting surface, and
the emission surface is provided along the mounting surface.

3. The vehicular lamp according to claim 2, wherein
the optical member is a projection lens that projects the light emitted from the main light source on the front side in the irradiation direction, and
the emission surface emits light toward the main light source.

4. The vehicular lamp according to claim 2, wherein
the optical member is a reflector that reflects the light emitted from the main light source to the front side in the irradiation direction, and
the emission surface emits light toward the reflector.

5. The vehicular lamp according to claim 1, wherein
the light guide member is fixed to the mounting surface at a first fixing part near the opening part, and is fixed to the mounting surface at a second fixing part opposite to the first fixing part with the main light source interposed between the first fixing part and the second fixing part.

6. The vehicular lamp according to claim 1, wherein
the opening part is a cutout part that opens an end of the mounting surface.

7. The vehicular lamp according to claim 1, wherein
the opening part is a through hole which opens the mounting surface.

8. A vehicular lamp comprising:
a main light source that emits light for forming a predetermined irradiation pattern;
an optical member that allows the light emitted from the main light source to travel toward a front side in an irradiation direction to form the irradiation pattern;
a heat dissipation member that includes a mounting surface on which the main light source is provided, and releases heat from the main light source to outside; and
a light guide member that guides light from an auxiliary light source provided as a separate body from the main light source, wherein
the heat dissipation member includes an opening part that opens the mounting surface, and
the light guide member is arranged to guide the light from the auxiliary light source through the opening part, the light guide member having an incident surface on which the light from the incident surface auxiliary light source is incident, and an emission surface that is provided along the mounting surface to emit the light from the incident surface toward the mounting surface.

* * * * *